United States Patent

[11] 3,628,375

| [72] | Inventor | Dominick A. Pagano<br>91 Strawberry Hill Ave., Stamford, Conn. 06902 |
|---|---|---|
| [21] | Appl. No. | 32,518 |
| [22] | Filed | Apr. 28, 1970 |
| [45] | Patented | Dec. 21, 1971 |

[54] APPARATUS FOR ULTRASONIC INSPECTION OF A LENGTH OF TEST MATERIAL
8 Claims, 4 Drawing Figs.

[52] U.S. Cl. .................................................. 73/71.5, 310/8.7
[51] Int. Cl. ..................................................... G01n 29/04, H04r 17/00
[50] Field of Search ........................................ 73/67.8, 67.9, 71.5; 310/8.3, 8.7

[56] References Cited
UNITED STATES PATENTS
2,984,756  5/1961  Bradfield ...................... 73/71.5 UX
3,257,843  6/1966  Cowan ......................... 73/71.5

Primary Examiner—Richard C. Queisser
Assistant Examiner—John P. Beauchamp
Attorney—Davis, Hoxie, Faithfull & Hapgood ABSTRACT: Apparatus for ultrasonic inspection of a length of test material adapted for rolling along the material and capable of adjustably aiming an ultrasonic beam at the material to be tested. Yoke means including a plane surface is disposed between axially aligned supporting shafts for adjustably mounting an ultrasonic transducer thereto. Coaxial coupling means is associated with one of the shafts and connected to said transducer for externally adjusting the position of the transducer along the plane of the yoke means for varying the angle of incidence at which the ultrasonic beam is transmitted to the test material. Wheel means including a cylindrical member transparent to the ultrasonic beam is rotatably mounted to the shafts and hermetically encloses the yoke means for providing rotation about the yoke means and the transducer. Back reflection attenuation means is operatively associated with the wheel means for attenuating unwanted back reflections to eliminate their detection by the transducer. Coupling fluid is retained within the wheel means for fluid coupling the ultrasonic beam to the test material through a portion of the cylindrical member in contact with the test material. Valve means is provided for simultaneously bleeding the wheel means as it is being filled with the coupling fluid to provide simultaneous removal of air therefrom, thereby minimizing the formation of air bubbles within the fluid. Traction means operatively associated with the wheel means provides frictional driving contact with the test material and prevents frictional contact of the end portions of the cylindrical member with the test material.

INVENTOR.
Dominick A. Pagano
BY

Robertson, Bryan, Parmelee & Johnson
ATTORNEYS.

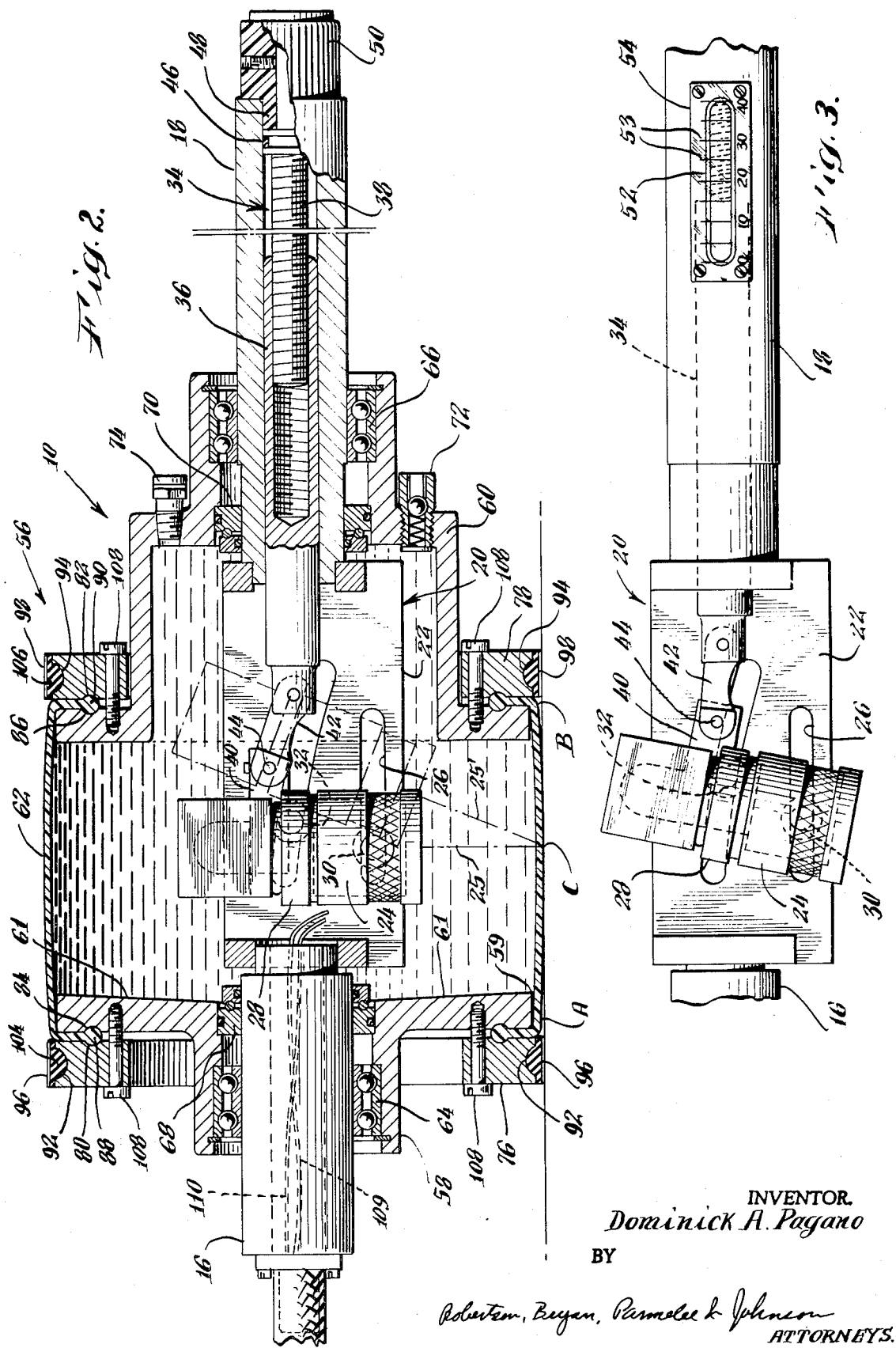

APPARATUS FOR ULTRASONIC INSPECTION OF A LENGTH OF TEST MATERIAL

DESCRIPTION

This invention relates to an apparatus for the ultrasonic inspection of a length of test material. More specifically, this invention relates to a new and improved ultrasonic wheel detector for for rolling along the length of material.

Various ultrasonic inspection units are known in the art for rolling contact with a length of material to be tested. Generally, these units have been quite complex in construction, being costly to construct and maintain. Such a complex unit using a number of tracks or rack and pinion arrangements allowing movement of the transducer along various planes is disclosed in U.S. Pat. No. 3,257,843 issued June 28, 1966. Further, these prior units have usually required a significant amount of "down time." Adjustments of the transducer are often cumbersome and the rotating wheel often wears out prematurely under continuous operation.

It is an object of the present invention to provide a superior ultrasonic inspection apparatus for inspection of a length of test material at low cost.

It is a further object to provide an ultrasonic inspection apparatus having a minimum of moving parts subject to wear, therefore minimizing the "down time" of the apparatus under continuous operation.

It is a further object to provide means for attenuating unwanted back reflections to eliminate their detection by the transducer.

It is a further object to provide a traction means for frictional driving contact with the test material to minimize the wear on the end portions of the wheel normally in contact with the test material.

It is a further object of the present invention to provide an improved transducer adjusting means.

It is still a further object of the present invention to provide a means for simultaneously bleeding the wheel as the coupling fluid is being introduced therein.

An apparatus for ultrasonic inspection of a length of test material is adapted for rolling along the material to be tested and is capable of aiming an ultrasonic beam at the material tested. Yoke means is disposed between two axially aligned supporting shafts and fixedly mounted thereto. The yoke means includes a plane surface having first and second slots arranged therein for adjustably mounting an ultrasonic transducer thereto. The first slot arranged within the yoke means allows longitudinal movement of the transducer therealong. The second slot is arranged to allow oblique movement of the transducer relative to the first slot.

A coaxial coupling means is associated with one of said shafts and is connected to the transducer for externally adjusting the position of the transducer along the plane formed by the slots of the yoke means whereby the angle of incidence at which the ultrasonic beam is transmitted through the fluid in the rolling wheel to the test material may be readily and accurately varied.

Wheel means including a cylindrical member transparent to the ultrasonic beam is mounted to the shafts and hermetically sealed thereto for enclosing the yoke means and transducer for rotation thereabout. Back reflection attenuation means is operatively associated with the wheel means for attenuating unwanted back reflecting eliminating their detection by the transducer. A coupling fluid is retained within the wheel means for fluid coupling the ultrasonic beam to a portion of the wheel means in contact with the test material. Valve means is provided for simultaneously bleeding air or fluid of the wheel means as it is being filled with the coupling fluid to provide simultaneous removal of air therefrom. Traction means is operatively associated with the wheel means for providing frictional driving contact with test material to prevent frictional contact of the end portions of the cylindrical member with the test material.

Other objects, aspects and advantages of the present invention will be more fully understood by one skilled in the art when the following detailed description is considered in conjunction with the accompanying drawings, as follows:

FIG. 2 is an enlarged partial cross-sectional view of the apparatus of FIG. 1;

FIG. 3 is an enlarged elevational view of the transducer showing it in a different adjusted position along the slots arranged in the yoke means.

Figure 1:
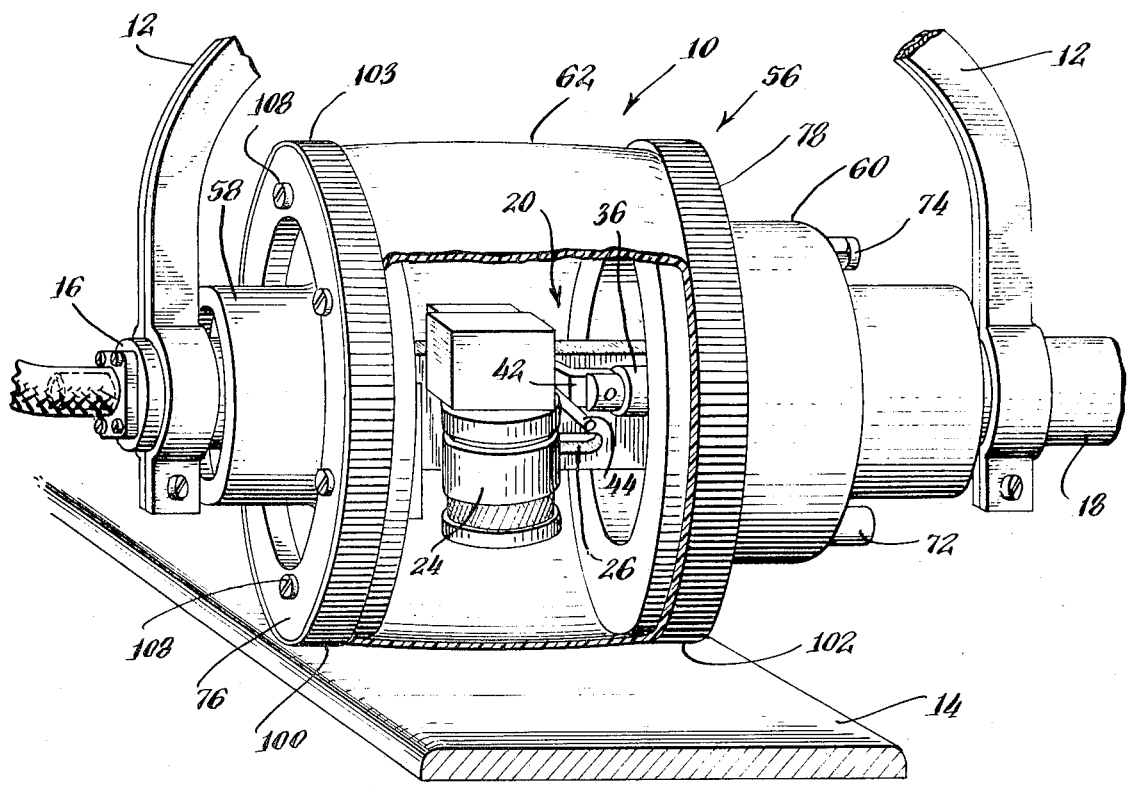
FIG. 1 is a perspective view with parts broken away of the apparatus for ultrasonic inspection of a length of test material mounted for rotation along a moving length of test material.

Referring to FIG. 1, the ultrasonic inspection apparatus 10 is shown mounted to a conventional support, e.g., a U-shaped frame 12 for rotational contact with a moving length of test material 14. A pair of axially aligned shafts 16 and 18 provide means for mounting the apparatus 10 in the U-shaped frame 12. Arranged between the axially aligned shafts 16 and 18 and integrally connected therewith is a yoke means 20 including a plane surface 22.

An ultrasonic transducer 24 is adjustably mounted to the plane surface 22 of the yoke means 20 for movement along first and second slots 26 and 28 (see FIGS. 2 and 3). The first slot 26 is longitudinally arranged within the plane surface 22 parallel to the opposing parallel edges thereof for movement of the lower portion of the transducer 24 therealong. The second slot 28 is obliquely arranged relative to the first slot 26 to provide oblique movement of the transducer 24 relative to the first slot 26. Additionally, the second slot 28 is slightly arcuate in shape to provide the desired movement of the transducer 24 therealong to control the inclination of the transducer 24 and therefore the angle of incidence of the ultrasonic beam 25 relative to a plane normal to the test material against which the wheel is rolling, as will be explained. The transducer 24 is mechanically coupled to the first and second slots 26 and 28, respectively, by Teflon pins 30 and 32, respectively, and operatively linked to a coaxial coupling or adjusting means 34 arranged concentrically in the shaft 18.

The coaxial adjusting means 34 includes a positive hollow lead nut 36 and screw 38 coaxially aligned in the shaft 18 and linked to the transducer 24 through a carriage support 40. A link coupling 42 operatively associated with the lead nut 36 is connected to a support pin 44 protruding from the carriage support 40. A sealing ring 46 and bushing 48 are concentrically mounted about the screw 38 which is moved by manually turning an axial knob 50.

The lead nut 36 also serves as an angle indicating slide (see FIG. 3). An elongated transparent plastic angle scale 52 having angle index scale lines 53 is seated within a rectangular recess 54 in the shaft 18 allowing visual detection of the movement of the lead nut 36 so as to indicate the position of the angle of the transducer beam 25 relative to a plane normal to the surface of the test material 14, i.e. the angle of incidence of the ultrasonic beam 25 relative to a plane normal to the surface of the test material 14 along which the wheel is rolling, as will be explained.

Wheel means 56, including rotatably mounted supporting frames 58 and 60 and a removable cylindrical urethane sleeve or tire 62 transparent to the ultrasonic beam 25 is rotatably mounted to shafts 16 and 18 by a pair of double row ballbearings 64 and 66 for rotational contact with the moving sheet of test material 14.

Support frame 58 includes back reflection attenuation means shown as slanted inner surface 61 (see FIG. 2). The inner surface 61 is slanted or raked from its peripheral edge 59 toward the shaft 16 between 4° and 6°, preferably 5°. This slanted arrangement provides sufficient attenuation of the unwanted back reflections by providing further reflection thereto to eliminate their detection by the transducer 24.

Magnetic seals 68 and 70 commercially available from Magnetic Seal Corporation, West Barrington, Rhode Island, are arranged about the shafts 16 and 18, respectively, for fluid sealing the wheel means 56 thereabout. The magnetic seals may include a magnetized ring mounted concentric with the shafts with an "O"-ring in contact with the supporting frames. A concentrically mounted case including a second sealing ring responsive to magnetic attraction is operatively associated with the magnetized ring and has an "O"-ring coupling the case to the shaft for rotation. Mounting the cylindrical urethane tire in position thereby hermetically seals the wheel means 56 for rotational movement about the shafts 16 and 18.

An intake valve 72 is provided in the supporting frame 60 of the wheel means 56 for the introduction of a coupling fluid, e.g., mineral oil, therein, A bleeder valve 74 is also arranged within the supporting frame 60 to allow simultaneous bleeding of air or fluid from the interior of the wheel means 56 as it is being pressurized with the coupling fluid thereby preventing the formation of the air bubbles within the coupling fluid which would interfere with the transmission of the ultrasonic beam.

Traction drive plates 76 and 78 are removably mounted to the supporting frames 58 and 60, respectively, adjacent the peripheral edges of the urethane tire 62. These traction drive plates 76 and 78 have grooves 80 and 82, respectively, arranged therein which mate with grooves 84 and 86, respectively, in the supporting frames 58 and 60 providing a retaining recess for clamping the ends, i.e. the beaded lip of the cylindrical urethane tire 62 therein. The ends of the cylindrical urethane tire each have a beaded lip 88 and 90 for positive clamping between the supporting frames 58 and 60 and mating traction drive plates 76 and 78, respectively.

Further, extending around the periphery of the traction drive plates 76 and 78 are channels 92 and 94 for reception of a snap-on replaceable drive treads 96 and 98, respectively. These plates 76 and 78 are arranged so that the mounted treads 96 and 98 extend slightly beyond the periphery of the end portions A and B of the urethane tire 62, and these treads 96 and 98 are firmly in frictional driving contact with the test material 14 thereby eliminating wear on the peripheral portions A and B of the tire 62, reducing the need for cumbersome tire changing so that the "down time" of the apparatus 10 is minimized.

Figure 4:
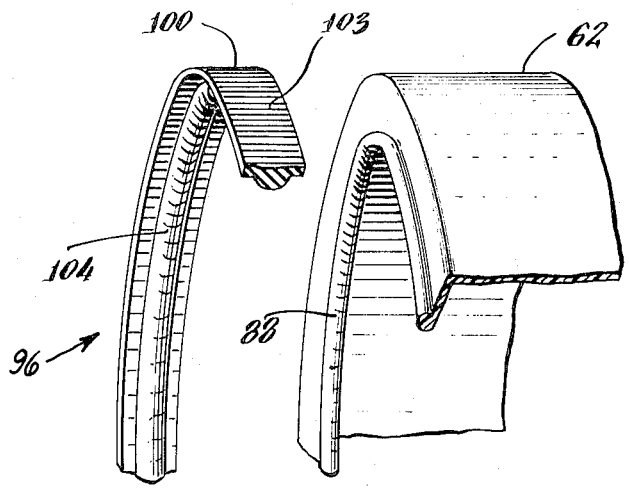
FIG. 4 is an enlarged partial perspective view of the traction tread and wheel cylinder.

The snap-on conveniently replaceable drive treads 96 and 98 (see FIGS. 1, 2 and 4) are ringlike in shape and include tracking surfaces 100 and 102 respectively, with transverse ridges 103 arranged therein for frictionally engaging the test material 14. Positioning interior ridges 104 and 106 are integrally formed with the tracking surfaces 100 and 102, respectively. The positioning ridges 104 and 106 are dimensioned to be snugly received within the channels 92 and 94 for mounting the replaceable drive treads 96 and 98 thereto.

For use in testing operation, the apparatus 10 is assembled and mounted to a conventional support, e.g., the U-frame 12. The cylindrical tire 62 is fitted over the supporting frames 58 and 60 so that the beads 88 and 90 of the ends of the tire 62 fit within the grooves 84 and 86 arranged within the supporting frames 58 and 60. The traction drive plates 76 and 78 are then mounted to the supporting frames with machine screws 108. Grooves 80 and 82 in the traction drive plates 76 and 78 mate with the grooves 84 and 86 in the supporting frames 58 and 60 to lock and seal the urethane tire 62 in position relative to the supporting frames 58 and 60. The flexible snap-on replaceable drive treads 96 and 98 are then conveniently mounted on the traction drive plates 76 and 78 so that the integral interior ridges 104 and 106 nest within the channels 92 and 94, respectively.

After the apparatus 10 is properly mounted, coupling fluid is introduced into the wheel means 56 through the intake valve 72 and simultaneously "bled" through the bleeder valve 74 to provide a rapid-fill system which minimizes the presence of air bubbles within the fluid which would inhibit the transmission of the ultrasonic beam to and from the test material 14.

The ultrasonic transducer 24 is positioned so that the projected ultrasonic beam 25 lies along the line of intersection of two planes which are perpendicular to the test material 14, i.e. the transducer is arranged normal to the test material. With the transducer 24 in this position the apparatus 10 is capable of detecting the thickness of the test material 14. If flaw detection is required the angle of the transducer 24 may be varied along the yoke means 20 through movement of the coaxial coupling means 34.

Electrical signal impulses are transmitted to the transducer 24 through leads 108 and 110 connected between conventional signal introducing means (not shown) and the transducer 24.

The ultrasonic transducer 24 is focused at a point on the cylindrical tire 62 that is in direct rolling contact with the material 14 to be tested. The tracking surfaces 100 and 102 are in direct frictional driving contact with the test material 14 to provide increased gripping friction for the rotating wheel means 56 and eliminate wear on the peripheral edges or outer ends of the urethane tire 62. The material 14 to be tested is conveyed or moved along by a conventional means (not shown) allowing rotational contact of the central portion C of the tire 62 with the test material 14 so that the ultrasonic beam from the transducer 24 is transmitted into the test material 14 as it is conveyed past the apparatus 10 and the reflected energy, which is reflected from any discontinuities within the test material 14, is received by the transducer 24.

The ultrasonic transducer 24 is a conventional transducer for transforming electrical signal pulses into mechanical vibrations and for transforming mechanical vibrations back into electrical impulses. The ultrasonic transducer 24 generates ultrasonic vibrations and projects them in a pulse beam toward the part to be tested. Any discontinuity in the path of the beam, as well as the opposite surface of the test material, will reflect the vibrations back as echoes. The reflected signals are received by the transducer 24 and converted to electrical signals which are transmitted to conventional means such as a cathode ray tube (not shown) for viewing.

If the angle of incidence of the ultrasonic beam is normal to the test material 14, reflections from the opposite side of the test material 14 are received by the transducer 24 as echoes for display on a cathode ray tube (not shown) to indicate the thickness of the material. If it is desired to scan the test material 14 for flaws the ultrasonic transducer 24 is moved by external control of the coaxial coupling means 34. The transducer 24 is moved along the slots 26 and 28 so that the ultrasonic beam is introduced into the material 14 at a specified angle of incidence, for example as shown in FIG. 2. Unwanted back reflections are sufficiently attenuated when reflected from the slanted inner surface 61 such that their detection by the transducer 24 is eliminated.

It is important to note that the ultrasonic beam is always focused at the same point along the cylindrical tire 62. That is, the axis of the ultrasonic beam 25 in the thickness detection position (FIG. 1) and the axis of the ultrasonic beam 25 in the flaw detection position (FIG. 3) intersect the same point C on the urethane tire 62 (see FIG. 2). Further, use of the coaxial coupling means 34 and carriage support 40 provides both positive and negative angles of swing of the transducer 24 along the slots 26 and 28, relative to the normal, assuring "peaking" of the ultrasonic beam for thickness detection testing.

Thus, is provided an improved ultrasonic inspection apparatus having high reliability and rapid adjustability with a high-life expectancy, projected to be over 50,000 hours from accelerated testing.

It should be understood by one skilled in the art that various modifications may be made in the present apparatus without departing from the spirit or scope of the invention as described in the specification and defined in the appended claims.

What is claimed is:

1. Apparatus for ultrasonic inspection by rolling contact with a length of test material capable of adjustably focusing an ultrasonic beam at the material to be tested comprising:
   an ultrasonic transducer capable of transmitting a beam of ultrasonic energy;
   first and second axially aligned supporting shafts;
   yoke means mechanically coupled between said shafts for mounting thereto said ultrasonic transducer, said yoke means including at least one slot;
   means for adjustably coupling said transducer to said slot within said yoke means;
   coaxial coupling means coaxially coupled to said first shaft and mechanically linked to said transducer for adjusting the position of said transducer along said slot for varying the angle of incidence at which the ultrasonic beam from said ultrasonic transducer is introduced into the test material;
   wheel means including support means and a cylindrical member transparent to the ultrasonic beam mounted on said support means, said wheel rotatably mounted about said shafts and hermetically enclosing said yoke means for rotation about said yoke means and said transducer and capable of retaining a coupling fluid therein for coupling the ultrasonic beam to a portion of said cylindrical member in contact with the test material; and
   traction means mechanically coupled to said wheel means for providing frictional driving contact with the test material and to prevent frictional contact of the end portions of said cylindrical member with the test material whereby an ultrasonic inspection apparatus is provided for rapid and accurate adjustment of said transducer along said yoke means while minimizing wear on said cylindrical member.

2. Apparatus for ultrasonic inspection by rolling contact with a length of test material capable of adjustably focusing an ultrasonic beam at the material to be tested as claimed in claim 1 wherein;
   said yoke means includes first and second slots for adjustably mounting said transducer thereto, said first slot arranged within said yoke means for longitudinal movement of said transducer along said yoke means, said second slot being slightly arcuate and arranged for oblique movement of said transducer relative to said first slot whereby said transducer may be adjustably moved along said slot by said coaxial coupling means to fix the position of said transducer relative to the test material for projecting the ultrasonic beam to the test material at the desired angle of incidence.

3. Apparatus for ultrasonic inspection by rolling contact with a length of test material capable of adjustably focusing an ultrasonic beam at the material to be tested as claimed in claim 1 wherein;
   said coaxial adjusting means includes a lead nut and screw arranged within said first shaft and mechanically linked to said transducer and an angle of incidence indicator visually arranged within said first shaft, whereby said sliding lead nut indicates the angle of incidence at which the ultrasonic beam is being introduced into the test material.

4. Apparatus for ultrasonic inspection by rolling contact with a length of test material capable of adjustably focusing an ultrasonic beam at the material to be tested as claimed in claim 1 including;
   first valve means for introducing fluid into said wheel means for fluid coupling said transducer to the test material through said cylindrical member to facilitate transmission of the ultrasonic beam to the test material; and
   second valve means for simultaneously bleeding said wheel means as it is being filled with fluid to minimize the formation of air bubbles within said fluid.

5. Apparatus for ultrasonic inspection by rolling contact with a length of test material capable of adjustably focusing an ultrasonic beam at the material to be tested as claimed in claim 1 wherein;
   said traction means includes two traction drive plates, one mounted concentrically about each of said first and second shafts and connected to said support means, each of said drive plates having a channel extending around the periphery thereof, and flexible circular drive treads having a tracking surface for frictionally engaging the test material and a ridge formed integrally therewith, said ridge dimensioned to fit within said channels for mounting said drive treads onto said drive plates.

6. Apparatus for ultrasonic inspection by rolling contact with a length of test material capable of adjustably focusing an ultrasonic beam at the material to be tested as claimed in claim 1 including;
   magnetic sealing means concentrically mounted above said first and second shafts and sealingly coupled to said support means for magnetically sealing said support means to said shafts to hold the coupling fluid within said wheel means while minimizing friction during rotation of said wheel means.

7. Apparatus for ultrasonic inspection by rolling contact with a length of test material of the type having a rotatable wheel and an ultrasonic transducer therein, said wheel having a peripheral wheel surface which is transparent to the ultrasonic beam for fluid coupling the transducer to the test material through the wheel surface, wherein the improvement comprises:
   traction means mechanically coupled to said rotatable wheel for providing frictional driving contact with the test material and to prevent frictional contact of the end portions of said peripheral wheel surface with the test material thereby minimizing wear thereon and the "down time" of said apparatus.

8. Apparatus for ultrasonic inspection by rolling contact with a length of test material of the type having a rotatable wheel and ultrasonic transducer therein, and first and second axially aligned shafts mechanically coupled to said wheel for rotation of said wheel thereabout, said wheel having a peripheral wheel surface which is transparent to the ultrasonic beam for fluid coupling the transducer to the test material through said wheel surface, wherein the improvement comprises:
   yoke means positioned within said wheel and mechanically coupled to said shafts, said yoke means including a plane surface with a first slot longitudinally extending therein and arranged parallel to the opposing edges of said plane surface, and a second slot obliquely arranged relative to said first slot;
   means for adjustably coupling said transducer to said slots within said plane surface; and
   coaxial coupling means coaxially coupled to said first shaft and mechanically linked to said transducer for adjusting the position of said transducer along said slots, whereby the angle of incidence of the ultrasonic beam from the transducer may be varied by controlling the position of said transducer in said slots by said coaxial coupling means.

* * * * *